United States Patent [19]

Zelenz

[11] Patent Number: 5,022,078

[45] Date of Patent: Jun. 4, 1991

[54] TELEVISION SIGNAL ENHANCEMENT AND SCRAMBLING SYSTEM

[75] Inventor: Martin L. Zelenz, DeWitt, N.Y.

[73] Assignee: Andrew F. Tresness, Syracuse, N.Y.

[21] Appl. No.: 490,788

[22] Filed: Mar. 8, 1990

[51] Int. Cl.$^5$ .............................. H04N 7/167
[52] U.S. Cl. ...................... 380/7; 380/15; 380/17
[58] Field of Search ................. 380/7, 15, 17

[56] References Cited

U.S. PATENT DOCUMENTS

| | | | |
|---|---|---|---|
| 3,729,576 | 4/1973 | Court | 380/17 |
| 4,398,215 | 8/1983 | Osaka | 380/15 |
| 4,527,195 | 7/1985 | Cheung | 380/15 |
| 4,623,918 | 11/1986 | Chomet | 380/7 |
| 4,748,667 | 5/1988 | Farmer et al. | 380/7 |
| 4,839,922 | 6/1989 | Imasaki et al. | 380/15 |

*Primary Examiner*—Stephen C. Buczinski
*Attorney, Agent, or Firm*—Berman, Aisenberg & Platt

[57] ABSTRACT

A television signal is distorted by passing it through a distortion amplifier which applies a Gaussian distortion curve to the signal. The curve has a maximum increase in amplitude of about 38 dB, which is about 30 dB with respect to the amplitude increase of the video carrier. The signal is further modified by the addition of gated jamming signals between the video and audio carriers. The jamming signals are present only during the horizontal and vertical blanking intervals and so do not affect the quality of the picture reproduced by the receiver. The distorted television signal is restored by applying a filter function which is the inverse of the distortion function. The gated jamming signals are removed by the restoring filter to a degree which permits the television receiver to read the horizontal and vertical sync signals and the color burst signal during the blanking intervals.

12 Claims, 2 Drawing Sheets

TELEVISION SIGNAL ENHANCEMENT AND SCRAMBLING SYSTEM

TECHNICAL FIELD

This invention relates to a system for modifying a television signal to increase the quality of the received picture while also providing scrambling.

BACKGROUND ART

In a known television scrambling system described in U.S. Pat. No. 4,074,311 (Tanner et al.), a scrambling signal is injected into the television signal between the video and audio carriers. The signal is removed by a notch filter for decoding.

Tanner et al. also teach signal preemphasis centered on the frequency of the scrambling signal to compensate for signal degradation due to the removal of the scrambling signal by the notch filter signal during decoding.

The Tanner system suffers from several disadvantages. For example, the signal preemphasis is generally inadequate to compensate for the degradation which results from the removal of the scrambling signal, particularly when the picture includes high spatial frequency components which require a high spectral content of the transmitted signal. This degradation is manifested by a blurring of the received picture which in some cases, for example, makes it difficult to read textual parts of the picture.

SUMMARY OF THE INVENTION

In accordance with a first aspect of the invention, a television signal is subjected to preemphasis which is so large that it is properly termed distortion. The distortion is applied in the region of the signal between the video and audio carriers and causes the demodulated video signal to experience carrier "pinch off" which results from over modulation of the carrier. This distortion is so large that most television sets are unable to produce an acceptable picture unless the signal is properly treated.

The signal can be restored to allow the television set to produce an acceptable picture by applying the signal to an amplifier or passive filter having a response characteristic which is the inverse of the distortion characteristic.

In the preferred embodiment, the distortion curve and the restoring curve have Gaussian shapes which limit the number of inflections to substantially reduce group delay. The maximum distortion is 38 dB, and the audio and video carriers are increased by 8 dB.

In accordance with a second aspect of the invention, at least one jamming signal is applied to the television signal only during the horizontal and vertical blanking pulses. The signal is gated to be applied only during these portions of the signal and prevents the television from detecting the real sync pulses, which assists in preventing the detection of a usable signal.

In a preferred embodiment, two such gated jamming signals are used, and they are spaced by a small frequency to prevent unauthorized decoding of a signal by application of a single, home made notch filter.

In an alternative embodiment, the gated jamming signals comprise noise, e.g. random frequencies within a selected band.

It has been found that a signal subjected to the distortion and restoration amplifiers of the invention produces a picture having a quality which is better than that which is presently available using jamming signals because the deleterious effects of the notch filter are greatly reduced.

DETAILED DESCRIPTION OF THE PREFERRED EMBODIMENT

Figure 1:
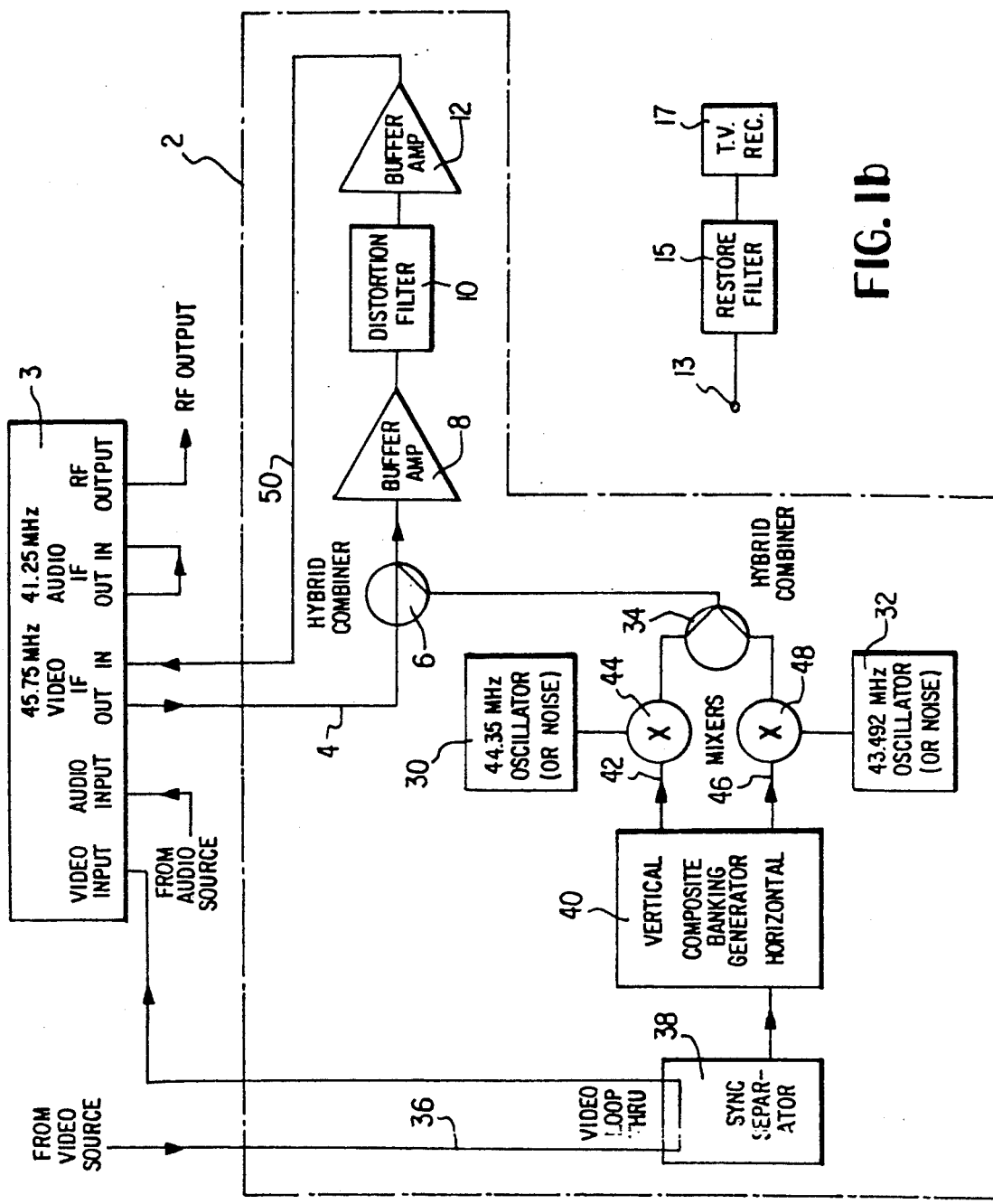
FIG. 1a is a block diagram of a encoder in accordance with the invention.
FIG. 1b is a block diagram of a decoder in accordance with the invention.

FIG. 1a is a block diagram of a system in accordance with the invention for use with a cable television system. A head end encoder 2 includes a video input line 4 which receives the video signal from modulator 3 wherein the video carrier is at an intermediate frequency of 45.75 MHz. The video signal is combined with gated jamming signal at a combiner 6, these jamming signal being described more fully below. The video signal is passed through a first buffer amplifier 8, a distortion amplifier 10, and a second buffer amplifier 12. The distorted signal is then returned to the modulator 3 for combination with the audio signal and subsequent transmission to a cable distribution network.

FIG. 1b illustrates a typical decoder and receiver for the transmitted signals. The signal from the cable television distribution system is received at 13 and is supplied to a passive filter 15. The signals from the filter are then supplied to a known television receiver 17 for reproduction of the picture and sound. The decoder thus preferably comprises a set of filters which restore the signal by providing the inverse of the distortion effected in the amplifier 10 whereby the television receiver can produce an acceptable picture.

Figure 2:
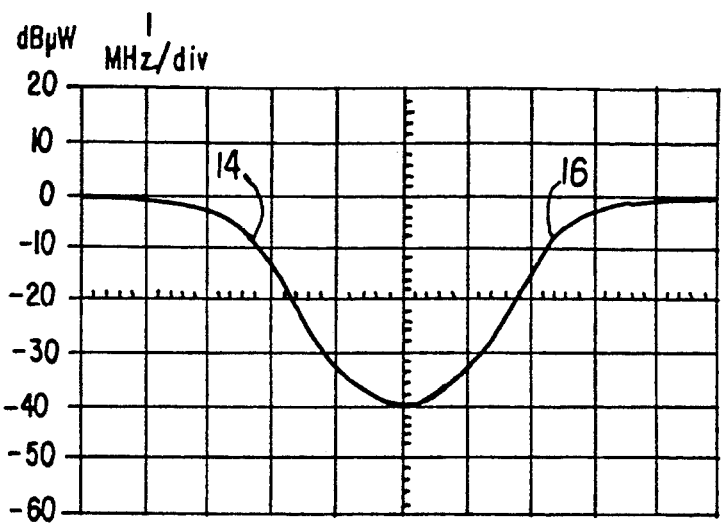
FIG. 2 is a graph showing a preferred restoration curve.

FIGS. 2 thorough 4 illustrate the preferred distortion characteristics of the distortion amplifier 10. FIG. 2 is a graph of the amplitude versus frequency response of the restoring filter and represents the inverse of the distortion caused by the amplifier 10. This curve is substantially Gaussian and the characteristics are as follows:

| Frequency (from center) | Attenuation |
| --- | --- |
| 0 MHZ | −38.7 dB |
| −2.25 MHz | −7.5 dB |
| −1.5 MHz | −22.5 dB |
| +1.33 MHz | −26.7 dB |
| −6.0 MHz | 0.0 dB |
| +6.0 MHz | 0.0 dB |

The approximate location of the video carrier is shown at 14, and the approximate location of the audio carrier is shown at 16. The maximum attenuation is 38.7 dB, and this is located at the frequency of the video carrier plus 2.25 MHz.

Figure 3:
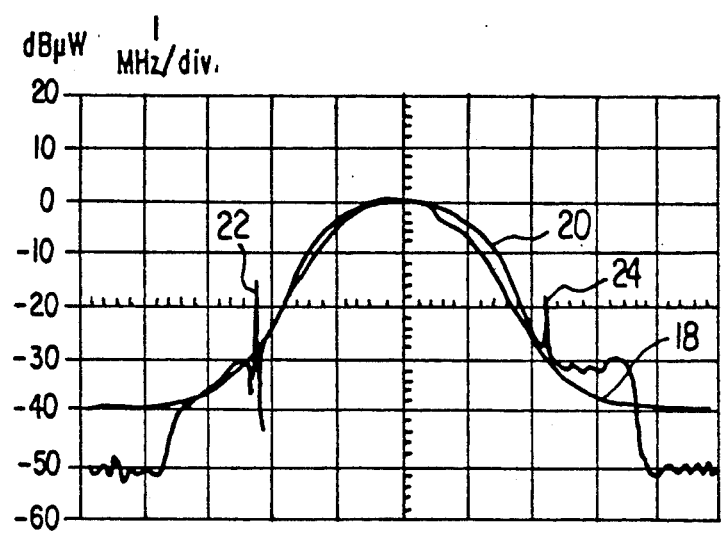
FIG. 3 is a graph showing a preferred distortion curve and the effect of distortion of a television signal.

With reference to FIG. 3, the distortion curve is shown at 18, and a typical distorted television signal is shown at 20. The video carrier is shown at 22, and the audio carrier is shown at 24.

Figure 4:
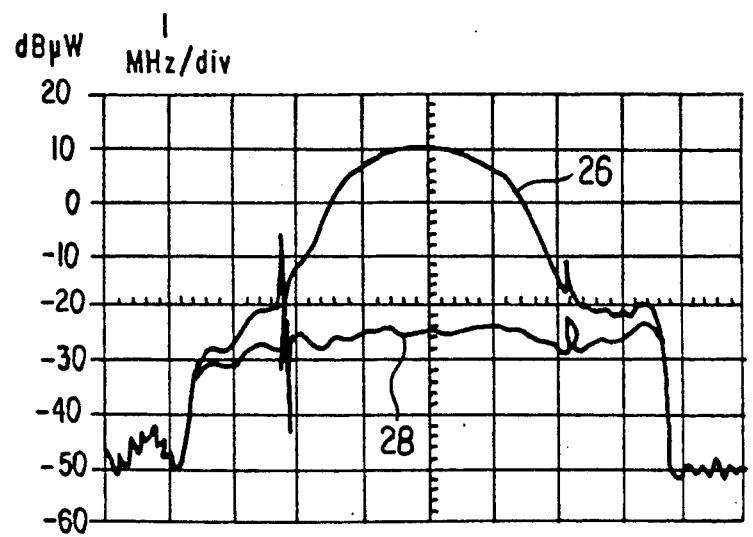
FIG. 4 is a graph comparing the distorted television signal with the restored signal.

FIG. 4 shows a comparison between a typical distorted television signal 26 and a restored signal 28 during the picture transmission part of the signal.

Referring again to FIG. 1, the gated jamming pulses of the invention will be described. The distortion-restoration system described with reference to FIGS. 2 through 4 provides adequate jamming of television signals for a large majority of the television receivers in use today. Some newer receivers, however, may be capable of producing a "viewable" picture from the distorted signal as shown by curve 26 of FIG. 4. Accordingly, applicants additionally provide two jamming signals between the audio and video carriers, the jamming signals having amplitudes such that they are each equal to the video carrier amplitude resulting at 50. These jamming signals are supplied only during the vertical and horizontal blanking periods, and the combination of the distortion and the gated jamming signals provides complete jamming for even state of the art receivers.

The gated jamming signals are provided by a first oscillator 30, which produces a signal spaced from the video carrier by about 1.4 MHz, and a second oscillator 32, which produces a signal spaced from the video carrier by about 2.258 MHz.

The video signal from the video source is supplied to a video loop 36, and the loop passes through a sync separator 38. The sync separator provides a series of pulses in accordance with the horizontal sync pulses, and the vertical sync pulses are derived from these. A composite blanking generator 40 generates a vertical signal 42 which controls a mixer 44 and a horizontal signal 46 which controls a mixer 48. The mixers are essentially gates controlled by the horizontal and vertical signals to allow the introduction of the signals from the oscillators 30 and 32 to a hybrid combiner 34 only during respective horizontal and vertical blanking intervals. The hybrid combiners themselves are known and provide low loss coupling of the signals from the input ports to the common output port.

The video signal which has been modulated by an intermediate frequency and which is supplied at 4 is combined with the gated jamming signals, and this combination is subjected to the buffer and distortion amplifiers 8, 10, and 12 as described above. The resulting signal at 50 is returned to the modulator for combination with the audio signal and transmission to the cable system.

While the gated jamming signals have been described as comprising carrier signals, they alternatively comprise noise. In a practical embodiment, the bandwidth of the noise was 3 MHz, but this may be larger or smaller. In accordance with this embodiment, the oscillators 30 and 32 are replaced by a noise generator which produces a noise signal for combination with the video signal in lieu of the jamming signals at single frequencies.

The gated jamming signals are inherently removed in large measure by the restoration filter 15 having the characteristics illustrated in FIG. 2. The restoration filter reduces the amplitude of the center of the signal between the audio and video carriers by about 30 dB with respect to the video carrier. Thus, the jamming signals are reduced in amplitude by about 97%. The residual 3% has been found to be small enough to permit the television receiver to read the information it is required to find in the blanking intervals, such as the horizontal sync signal, the color burst signal, and vertical interval signals. This remaining 3% can, however, reduce the quality of the picture if it is present during the interval when the signal carries picture information. Because these jamming signals are gated, however, they are not present when the picture information is transmitted and do not interfere with the production of a high quality picture by the receiver.

It will be appreciated that a unique technique for improving the quality of a television picture and for preventing unauthorized of television signals has been described. Modifications within the scope of the appended claims will be apparent to those of skill in the art.

I claim:

1. A television system comprising:
   means for generating a television signal having frequency spaced video and audio carriers;
   means for distorting said television signal in the region of said signal between said video and audio carriers by increasing the peak amplitude of the signals in said region by an amount such that said video carrier experiences carrier pinch off, wherein said means for distorting comprises means for increasing the amplitude of said signal in said region as a function of frequency.

2. A television system according to claim 1 wherein said means for distorting increases the amplitude of the signal in said region with respect to frequency such that group delay of the signals in said region is minimized.

3. A television system according to claim 2 wherein said means for distorting comprises means for increasing said amplitude in accordance with a Gaussian curve.

4. A television system according to claim 3 wherein said means for distorting increases said peak amplitude by approximately 40 dB.

5. A television system according to claim 1 further comprising means for restoring said television signal by decreasing the magnitude of said signals in said region by amounts substantially equal in magnitude but opposite in sign to the amount of increase provided by said means for distorting.

6. A television system according to claim 1 further comprising means for supplying a gated jamming signal in said region during one of a vertical or horizontal blanking portions of said signal.

7. A method for scrambling a television signal having a video carrier and an audio carrier comprising distorting said signal by increasing the amplitude of said signal between said video and audio carriers as a function of frequency by a characteristic curve having a maximum of about 30 dB with respect to the amplitude of said video carrier to produce a distorted signal.

8. A television system according to claim 7 wherein said means for reducing comprises means for restoring said television signal by decreasing the magnitude of said signals in said region by amounts substantially equal in magnitude but opposite in sign to the amount of increase provided by said means for distorting.

9. A method for scrambling a television signal having a video carrier and an audio carrier comprising distorting said signal by increasing the amplitude of said signal between said video and audio carriers by a characteristic curve having a maximum of about 30 dB with respect to the amplitude of said video carrier to produce a distorted signal.

10. A method according to claim 9 further comprising the step of increasing the amplitude of said video carrier by about 8 dB.

11. A method according to claim 10 further comprising the step of supplying jamming signals between said audio and video carriers during at least one of the horizontal or vertical blanking intervals.

12. A method according to claim 11 further comprising the step of restoring said television signal by decreasing the amplitude of said distorted signal by an amount equal to but opposite is sign to said characteristic curve.

* * * * *